(12) United States Patent
Jones et al.

(10) Patent No.: US 7,897,093 B2
(45) Date of Patent: Mar. 1, 2011

(54) THERMOPLASTIC ARTICLES AND IMPROVED PROCESSES FOR MAKING THE SAME

(75) Inventors: Mary Ann Jones, Midland, MI (US); Kurt A. Koppi, Midland, MI (US); Stephanie K. Anderson, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 550 days.

(21) Appl. No.: 11/736,342

(22) Filed: Apr. 17, 2007

(65) Prior Publication Data

US 2007/0246862 A1   Oct. 25, 2007

Related U.S. Application Data

(60) Provisional application No. 60/745,116, filed on Apr. 19, 2006.

(51) Int. Cl.
   *B29C 45/00* (2006.01)
(52) U.S. Cl. .............. 264/328.8; 264/328.17; 264/328.18
(58) Field of Classification Search ................... 525/191; 264/328
   See application file for complete search history.

(56) References Cited

U.S. PATENT DOCUMENTS

| | | | |
|---|---|---|---|
| 3,682,443 A | 8/1972 | Upmeier | |
| 4,663,103 A | 5/1987 | McCullough et al. | |
| 4,732,926 A | 3/1988 | Faulkner | |
| 5,130,076 A * | 7/1992 | Blatz et al. | 264/540 |
| 5,215,764 A * | 6/1993 | Davis et al. | 425/208 |
| 5,298,587 A | 3/1994 | Hu et al. | |
| 5,320,875 A | 6/1994 | Hu et al. | |
| 5,433,786 A | 7/1995 | Hu et al. | |
| 5,494,712 A | 2/1996 | Hu et al. | |
| 5,837,958 A | 11/1998 | Fornsel | |
| 6,441,081 B1 | 8/2002 | Sadatoshi et al. | |
| 6,525,157 B2 | 2/2003 | Cozewith et al. | |
| 6,710,145 B2 | 3/2004 | Sonnenschein et al. | |
| 6,713,578 B2 | 3/2004 | Sonnenschein et al. | |
| 6,713,579 B2 | 3/2004 | Sonnenschein et al. | |
| 6,730,759 B2 | 5/2004 | Sonnenschein et al. | |
| 6,806,330 B1 | 10/2004 | Sonnenschein et al. | |

(Continued)

FOREIGN PATENT DOCUMENTS

EP   0444671   9/1991

(Continued)

OTHER PUBLICATIONS

Verbraak, C. et al., "Screw Design in Injection Molding, "Polym. Eng. & Sci., vol. 29, No. 7, 1989, pp. 479-487.

(Continued)

*Primary Examiner* — Khanh Nguyen
*Assistant Examiner* — Margaret Squalls
(74) *Attorney, Agent, or Firm* — Dobrusin & Thennisch PC

(57) ABSTRACT

The present invention is directed to improved processes for making plastic articles, and articles made therefrom. In a broad aspect, the invention is directed to improved processes and articles made therefrom, that include the steps of providing as separate materials a first material that includes a thermoplastic polyolefin, a second material including an admixture of a particulated filler and a second thermoplastic polyolefin, and a third material that includes an elastomer; applying a shear force to the first, second and third materials, while the materials are at an elevated temperature for blending the materials to form a molten blend; shaping the molten blend and solidifying the molten blend.

20 Claims, 1 Drawing Sheet

U.S. PATENT DOCUMENTS

| | | | |
|---|---|---|---|
| 6,949,603 B2 | 9/2005 | Sonnenschein et al. | |
| 7,004,739 B2 * | 2/2006 | Thomson | 425/131.1 |
| 2003/0204017 A1 | 10/2003 | Stevens et al. | |
| 2004/0014891 A1 * | 1/2004 | Krabbenborg et al. | 525/191 |
| 2004/0048967 A1 | 3/2004 | Tomomatsu et al. | |
| 2004/0171758 A1 | 9/2004 | Ellul et al. | |
| 2005/0004332 A1 | 1/2005 | Jialanella et al. | |
| 2005/0049346 A1 | 3/2005 | Blanchard et al. | |
| 2005/0070673 A1 | 3/2005 | Novak et al. | |
| 2005/0087906 A1 | 4/2005 | Caretta et al. | |
| 2005/0137370 A1 | 6/2005 | Jialanella et al. | |
| 2005/0250890 A1 | 11/2005 | Chen et al. | |

FOREIGN PATENT DOCUMENTS

| | | |
|---|---|---|
| EP | 0987091 | 3/2000 |
| JP | 60031514 | 2/1985 |
| JP | 2004-168876 | 6/2004 |
| JP | 2005-178146 A | 7/2005 |
| WO | WO00/34027 | 6/2000 |
| WO | WO 03/040201 | 5/2003 |
| WO | WO2005/105868 | 11/2005 |

OTHER PUBLICATIONS

Han, C.D. et al., "Morphology and Mechanical Properties of Injection Molded Specimens of Two-Phase Polymer Blends," Journal of Applied Polymer Science, vol. 21, 1977, pp. 353-370.

"EXACT Plastomers—High Performance Solutions for TPO Applications," ExxonMobil Technical Bulletin, May 2005.

Wunderlich, B., Macromolecular Physics, vol. 3, Crystal Melting, Academic Press, New York, 1980, p. 48.

* cited by examiner

US 7,897,093 B2

THERMOPLASTIC ARTICLES AND IMPROVED PROCESSES FOR MAKING THE SAME

CLAIM OF BENEFIT OF FILING DATE

The present application claims the benefit of the filing date of U.S. application Ser. No. 60/745,116, filed Apr. 19, 2006, hereby incorporated by reference.

FIELD OF THE INVENTION

The present invention relates to shaped thermoplastic articles and processes for making the same, and in one particular aspect, to injection molded thermoplastic polyolefin articles that are blended while in an injection molding machine.

BACKGROUND OF THE INVENTION

In the field of plastics there continues to be a need for materials that have good mechanical properties, and which are relatively inexpensive and efficient to make. With the recent upsurge in raw material prices and the cost of energy for processing the materials, the search has intensified for attractive alternative materials systems that satisfy the physical and mechanical needs met by many current commercial plastics. In the field of thermoplastic polyolefins, for example, it would be attractive to have an effective material system that reduces the dependency upon pre-fabricating compounding steps, particularly those that subject the starting materials to heat history, that require energy consumption for processing, or both.

Examples from the literature addressing the preparation of materials in this field include Published U.S. Application Nos. US20040048967A1, 20050070673A1, 20050250890A1, 20050049346A1; U.S. Pat. Nos. 4,732,926; 5,130,076; and 6,441,081; EP Patent Application No. 0987091A1; JP Patent Application 2004168876; Verbraak, C., et al, "Screw Design in Injection Molding," Polym. Eng. & Sci., Vol. 29, No. 7, 1989, pp 479-487; and Han, C. D., et al, "Morphology and Mechanical Properties of Injection Molded Specimens of Two-Phase Polymer Blends," Journal of Applied Polymer Science, Vol. 21, 1977, pp 353-370. "EXACT Plastomers—High Performance Solutions for TPO Applications," ExxonMobil Technical Bulletin, May, 2005 appears to address the effect of elastomer/PP viscosity ratio on ductile-brittle transition temperature; all of which are hereby expressly incorporated by reference.

SUMMARY OF THE INVENTION

The present invention is directed to improved processes for making plastic articles, and articles made therefrom. In a broad aspect, the invention is directed to improved processes, and articles made therefrom, that include the steps of providing as separate materials a first material that includes or consists essentially of a polyolefin (e.g., a thermoplastic polyolefin), an optional second material including an admixture of a particulated filler and a second thermoplastic polyolefin, and a third material that includes or consists essentially of an elastomer; applying a shear force to the first, second and third materials, while the materials are at an elevated temperature for blending the materials to form a molten blend; shaping the molten blend and solidifying the molten blend.

In a more specific aspect, the processes include the steps of feeding to an injection molding machine a first material that consists essentially of a thermoplastic polyolefin or polypropylene homopolymer; optionally feeding to the injection molding machine a second material including an admixture of a particulated filler and a second thermoplastic polyolefin or polypropylene homopolymer; feeding to the injection molding machine a third material that consists essentially of an elastomer; blending the first, second and third materials within the injection molding machine to form a blend; and injecting the blend into a tool wherein the process is substantially free of a step of compounding together the first, second and third materials prior to the blending step.

DETAILED DESCRIPTION OF THE INVENTION

Figure 1:
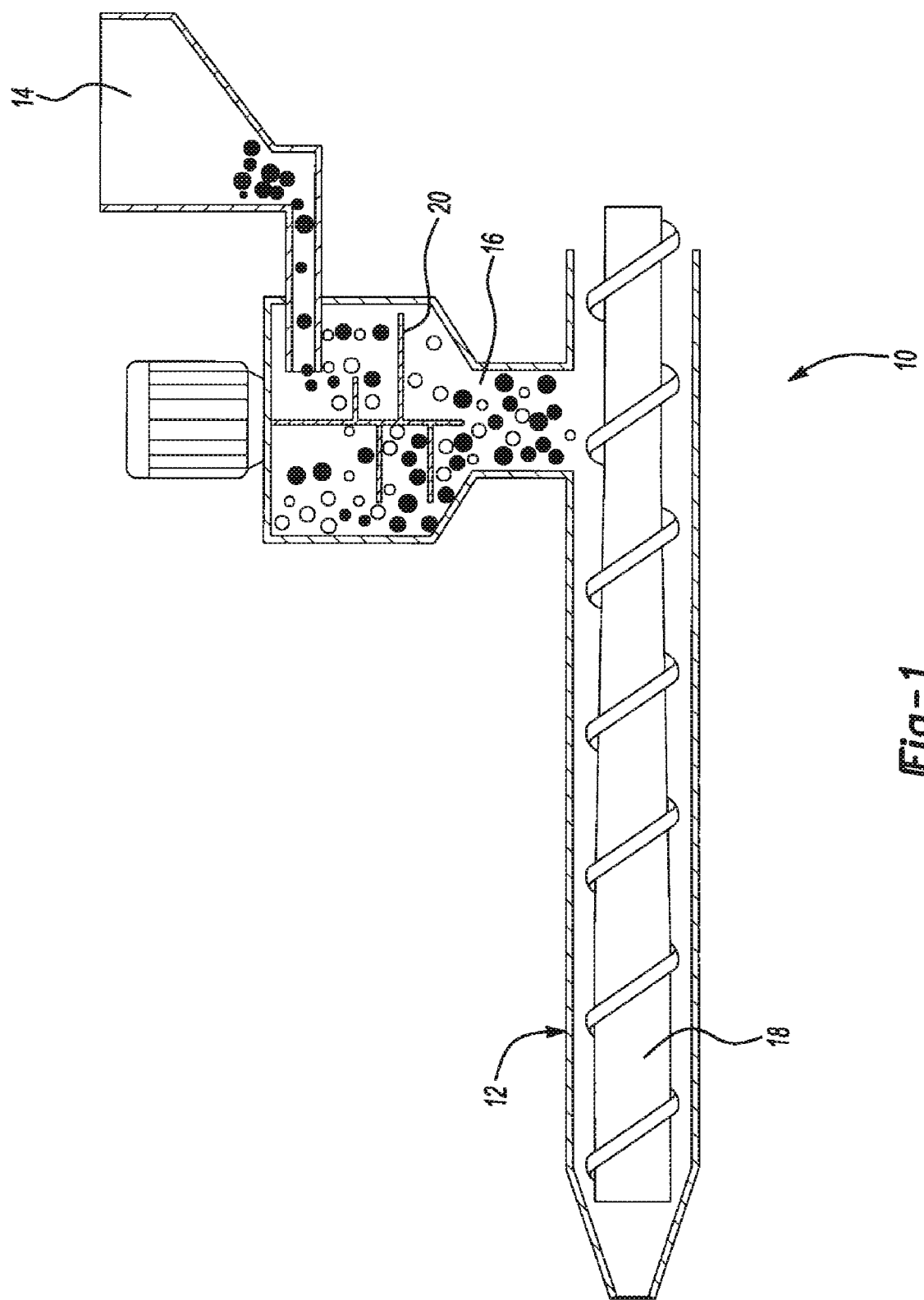
FIG. 1 is a schematic of an apparatus in accordance with the teachings herein.

The present invention is directed to improved processes for making plastic articles, and articles made therefrom. In a broad aspect, the invention is directed to improved processes and articles made therefrom, which include the steps of providing as separate materials a first neat polyolefin (e.g., a thermoplastic polyolefin or polypropylene homopolymer), a second material including an admixture of a particulated filler and a second polyolefin (e.g., a thermoplastic polyolefin or polypropylene homopolymer, which is the same as or different from the first neat polyolefin), and a neat elastomer; applying a shear force to the three materials, while the materials are at an elevated temperature for blending the materials to form a molten blend; shaping the molten blend and solidifying the molten blend. Desirably, the process is free of a step of compounding together the three materials prior to the blending step, and specifically is free of a prior compounding step that includes a melt blending step.

From the above, it can be seen that the step of shaping the molten blend can be performed using any one or combination of a number of art-disclosed techniques for making shaped articles. By way of example, the shaping can be done by blow molding, injection molding, or any combination thereof. In general, such step advantageously employs a suitable apparatus for imparting a shear force to the feedstock, particularly at an elevated temperature, so that a molten blend is obtained. By way of example, with reference to FIG. 1, a typical approach employs an apparatus 10 having a screw and barrel assembly 12, into which the feedstock is fed, such as by introduction directly from a storage container (e.g., container 14 shown for the concentrate) and via a mixing hopper 16. As material advances along a screw 18 within the screw and barrel assembly 12, it will be mixed by dispersive mixing, by distributive mixing or both. A mixing arm 20 may be employed for dry mixing. Suitable feeders may be used such as a gravimetric feeder, such as one including a weigh scale (e.g., available from Maguire). For example, a gravimetric feeder with at least one weigh scale may feed to the mixing hopper. A blender may be employed, such as one incorporated in the gravimetric feeder, in the mixing hopper, or both.

The material may be subjected to a mixing flight that includes at least one undercut for providing dispersive mixing, at least one bypass channel for providing distributive mixing or both. After forming a desired blend, the blended material is expelled from the apparatus, such as through an optional mixing nozzle, and brought into contact with a tool wall (not shown) for defining the shape of the desired article.

A screw and barrel assembly as used herein may be of any suitable dimensions for accomplishing the desired results. In one approach, wherein the blending step occurs within the screw and barrel assembly, the screw and barrel assembly has a length to diameter ratio greater than about 5:1, more specifically greater than about 10:1 and still more specifically greater than about 15:1 (e.g., about 15:1 to 25:1).

Another consideration that may be employed during blending within a screw and barrel assembly, according to the teachings herein, is the selection of an appropriate back pressure (namely the pressure applied to the plastic during screw recovery), the screw compression ratio, or both. By way of example, in one illustrative aspect, a back pressure of at least about 100 psi, and more specifically at least about 150 psi, or even at least about 200 psi (e.g., about 250 psi) is applied to the first, second and third materials during the blending step, a screw compression ratio of greater than about 1:1 (and more specifically at least about 2:1, such as about 2:1 to 3.5:1 or higher (e.g., about 2.4:1)) is employed, or a combination of both.

A screw speed of about 25 to 250 rpm may be employed during the blending step. It may be desirable to employ a screw speed of about 20 to 100 rpm, more specifically about 30 to about 80, and still more specifically about 40 to about 60 rpm, during the blending step.

The blending step may occur at any suitable melt set point temperature for the particular machine employed. For example, it may occur at a melt set point temperature for the machine of about 200 to about 270° C., and more specifically at about 210 to about 255° C., and still more specifically at about 220 to about 240° C.

Optionally, the injecting step includes passing the blend through a static mixer, such as a mixing nozzle (e.g., an interfacial surface generating mixing nozzle).

A variety of art-disclosed screw designs may be employed to achieve good mixing, with high performance designs being particularly attractive. One feature of high performance designs is the presence of two or more channels with varying channel dimensions along the length of the screw. This variation in channel dimension forces material to flow between channels, resulting in improved mixing. For example, distributive mixing is accomplished by cutting and folding a polymer melt stream whereas dispersive mixing is accomplished by forcing a polymer melt stream through a restrictive channel. Some examples of high performance screws consist of but are not limited to Energy Transfer (ET) screws, double wave screws, Stratablend™ screws, and UniMix™ screws. Secondary mixing devices may also be employed to improve mixing. These secondary mixing devices may be incorporated into the screw design (dynamic mixer) or they may be incorporated downstream of the screw (static mixer). Some examples of dynamic mixers consist of but are not limited to one or more of a Maddock-style mixers, blister mixers, spiral dam mixers, pin mixers, and mixing rings. Some examples of static mixers consist of but are not limited to Kenics™ mixers, interfacial surface generator (ISG) mixers, and Koch™ mixers. In the case of injection molding, such static mixer designs can be incorporated into the nozzle and they are referred to as mixing nozzles.

As can be seen from the above, though a compounding process that includes melt blending the starting materials may optionally be employed in advance of feeding the materials into the apparatus, a particularly desired approach is to omit such step. Thus, the process is substantially free of a step of compounding together the first, second and third materials prior to the blending step. It is surprisingly possible to do so by employment of certain or all of the above-discussed processing conditions. Advantageously, for enhancing the characteristics of the resulting materials, the selection of the first, second and third materials may also be an important consideration.

Turning to the first material, generally, it will include a polyolefin, and more particularly a thermoplastic polyolefin (that is, a polyolefin alloy that includes polypropylene and a flexibilizing component, such as polyethylene). Desirably, as employed in the processes herein, the first material is a neat polyolefin, such as a polypropylene impact copolymer characterized by a melt flow rate of less than about 70 g/10 min (at 230° C., 2.16 kg)(e.g., about 1 to about 55 g/10 min, more particularly about 5 to about 45 g/10 min, and still more particularly about 20 g/10 min to about 35 g/10); containing greater than about 8 wt % (by weight of the first material) of ethylene (e.g., greater than about 12 wt % ethylene); having crystallinity greater than about 40% (e.g., greater than about 50%, or any combination thereof. In the final overall material the first material will typically be present in an amount greater than about 20 wt %, more particularly greater than about 35 wt %, and more specifically, about 40 to about 90 wt %, and still more specifically about 50 to about 75 wt %) of the final material. A neat polypropylene homopolymer may be used in place of, or in addition to, the neat polypropylene impact copolymer. It will be appreciated that the employment of polymers herein desirably employ the polymers in a neat state. Of course, the teachings also contemplate the possible inclusion in the polymer of suitable art-disclosed additives of a type such as a clarifier/nucleator, a lubricant, a slip agent, a stabilizer (e.g., thermal stabilizer), any combination thereof or the like.

Turning next to the second material, when employed, it typically will include an admixture that includes, or (in a more specific aspect) consists essentially of, a particulated filler and a second thermoplastic material, and specifically an polyolefin (e.g., thermoplastic polyolefin or polypropylene homopolymer). While any of a number of alternative art-disclosed fillers may be employed (e.g., mica, calcium carbonate, silica, clays, wood, titanium dioxide), a preferred filler is talc (e.g., one that consists essentially of $3MgO.4SiO_2.H_2O$). The fillers may have any suitable median particle size, e.g., on the order of about 10 microns or smaller (e.g., about 7 microns or less, or even about 5 micron or less, or possibly even less than about 3 microns (e.g., less than about 1 micron)). The fillers may be any suitable top-size particle size, e.g., on the order of about 50 microns or smaller (e.g., less than about 30 microns, or more specifically less than about 15 microns).

With the second material, it is desirable that the filler be compounded (e.g., by a melt blending step) in advance with the second thermoplastic material. It is desired that the filler be mixed so that it distributes generally uniformly throughout the second material. At that time it is also possible that the second material will be admixed to include one or more additives, as taught elsewhere herein. It is also possible at this stage to add a colorant or pigment. In one approach it may also be desirable to add another polymer in addition to the second thermoplastic, such as a polyethylene (e.g., LLDPE). Thus, it can be seen that the second thermoplastic material may employ the same type of polymer as the first material, or another polymer or combination of polymers. In a particular example in accordance with the present teachings, the second thermoplastic is a neat polypropylene impact copolymer, such as one characterized by a melt flow rate of less than about 80 g/10 min (at 230° C., 2.16 kg)(e.g., about 1 to about 55 g/10 min, more particularly about 5 to about 45 g/10 min, and still more particularly about 20 g/10 min to about 35 g/10); containing greater than about 8 wt % (by weight of the first material) of ethylene (e.g., greater than about 12 wt % ethylene); having crystallinity greater than about 40% (e.g., greater than about 50%, or any combination thereof.

As can be appreciated, the second material may be regarded effectively as a masterbatch, or in a particular example, as a "concentrate". Thus, from another perspective the amount of filler (e.g., talc) in the concentrate will commonly be greater than about 50 wt % of the concentrate, such as from about 50 to about 85 wt %, and more specifically, from about 60 to about 75 wt % of the concentrate. For example, the amount of the respective materials is selected so that the filler is present in the final material in an amount less than about 40 wt %, more specifically less than about 30 wt %, and still more specifically less than about 20 wt %. Further, as above, a polypropylene homopolymer may be used in place of, or in addition to, the neat polypropylene impact copolymer in the second material. Moreover, if one or more additives are desired in the final material, it is possible that such additives will be included within the concentrate.

Though the teachings herein generally contemplate that a concentrate or masterbatch is employed, it is possible that the teachings will produce desirable characteristics in the absence of such concentrate or masterbatch. Accordingly, the present invention also contemplates processes and systems that result in materials that are substantially free of a filler (e.g., substantially free of talc).

The polyolefin for use in the first material, the second material or both, may include propylene-ethylene copolymers (which may be rubber-modified). Examples of a suitable material that includes or consists essentially of a polyolefin are available from The Dow Chemical Company under the designation of C705-44NA or C715-12NHP.

Additional specific examples of polymers that may be employed in accordance with the present teachings include those disclosed in WO 03/040201 A1, published US Application No. 2003-0204017, and U.S. Pat. No. 6,525,157, all of which are incorporated by reference. Polymers made with a metallocene catalyst are also possible for use in the first material, the second material or both.

Turning finally to the third material, as indicated, it generally will be an elastomer, and particularly a thermoplastic elastomer, such as a neat one that includes an alpha-olefin comonomer (e.g., propylene, 1-butene, 1-hexene, 1-octene), and has a density less than about 0.9 g/cc, a melt flow rate of about 0.1 to about 30 g/10 min (at 190° C., 2.16 kg), and more specifically about 0.5 to about 25 g/10 min (at 190° C., 2.16 kg), has a glass transition temperature of less than about –30 C, or any combination thereof. The materials used herein optionally are substantially free of EPDM rubber. In the final overall material, the third material will typically be present in an amount less than about 60 wt %, more particularly less than about 50 wt %, and more specifically about 2 to 45 wt % (e.g., about 15 to 45 wt %) of the final material. Higher amounts of elastomer may be employed in instances, for example, when polypropylene homopolymer is used in place of copolymer. Examples of a suitable material that includes or consists essentially of an elastomer are commercially available from The Dow Chemical Company under the designation of Affinity® (e.g., including EG-8100 or EG-8200). Elastomers are defined as materials which experience large reversible deformations under relatively low stress. Elastomers are typically characterized as having structural irregularities, non-polar structures, or flexible units in the polymer chain. Preferably, an elastomeric polymer can be stretched to at least twice its relaxed length with stress and after release of the stress returns to approximately the original dimensions and shape. Some examples of commercially available elastomers include natural rubber, polyolefin elastomers (POE), chlorinated polyethylene (CPE), silicone rubber, styrene/butadiene (SB) copolymers, styrene/butadiene/styrene (SBS) terpolymers, styrene/ethylene/butadiene/styrene (SEBS) terpolymers and hydrogenated SBS or SEBS. Preferred elastomers are polyolefin elastomers. Suitable polyolefin elastomers for use in the present invention comprise one or more $C_2$ to $C_{20}$ alpha-olefins in polymerized form, having a glass transition temperature ($T_g$) less than 25° C., preferably less than 0° C. $T_g$ is the temperature or temperature range at which a polymeric material shows an abrupt change in its physical properties, including, for example, mechanical strength. T.sub.g can be determined by differential scanning calorimetry. Examples of the types of polymers from which the present polyolefin elastomers are selected include polyethylene and copolymers of alpha-olefins, such as ethylene and propylene (EPM), ethylene and 1-butene, ethylene and 1-hexene or ethylene and 1-octene copolymers, and terpolymers of ethylene, propylene and a diene comonomer such as hexadiene or ethylidene norbornene (EPDM) and ethylene, propylene and a $C_4$ to $C_{20}$ alpha-olefin. A preferred polyolefin elastomer is one or more substantially linear ethylene polymer or one or more linear ethylene polymer (S/LEP), or a mixture of one or more of each. Both substantially linear ethylene polymers and linear ethylene polymers are well known.

The relative amounts of the first, second and third materials will range from about 30 to 90 parts by weight of the first material, optionally up to about 30 parts by weight of the second material, and about 3 to 40 parts by weight of the third material. For example, it is possible that the elastomer of the third material will result in a rubber content in the overall resulting material that ranges from about 2 to about 40 wt %. It is generally contemplated that additions of a rubber in the first and third material in an amount of at least about 2 wt % of the starting materials.

As will be appreciated, the qualification of materials as "first", "second" and "third" is for sake of convenience. Unless specified, use of those terms should not be construed as excluding other materials. Nor should it be construed as suggesting that any particular sequence of processing steps need be employed. Other ingredients may be employed in addition to the above first, second and third materials, including but not limited to art disclosed ingredients such as one or more fillers, reinforcements, light stabilizers, colorants, flame retardants, thermal stabilizers, nucleators, or the like.

It is contemplated that two or more of the first, second and third materials can be supplied together as a kit, such as in one or more suitable containers. Such kit, as well as its individual component materials are, therefore within the scope of the present invention.

Materials resulting from the teachings herein will have any combination of at least two (and more specifically at least 3, 4 or all) of the following properties; namely, a density from about 0.85 to about 1.05 g/cc, and more specifically about 0.9 to about 1.0; flexural modulus that ranges from about 600 to about 2500 MPa, more specifically about 700 to about 1700 MPa, and still more specifically about 900 to about 1300 MPa; a tensile strength (at yield) of at least about 8 MPa, more specifically at least about 10 MPa, and still more specifically, at least about 12 MPa; failure in a ductile mode (e.g., multi-axial dart impact testing (Instrumented Dart Impact)) of greater than about 90% of samples, and more specifically, approximately 100% (at –40° C., –30° C. or 0° C.); or shrinkage of less than 1%, and more specifically, less than about 0.7%.

More specifically, materials resulting from the teachings herein will have any combination of failure in a ductile mode (e.g., multi-axial dart impact testing (Instrumented Dart Impact)) of greater than about 90% of samples, and more specifically, approximately 100% (at −40° C., −30° C. or 0° C.) and notched Izod Impact value of at least about 3 (e.g., about 5 or higher) ft-lbs/in; and optionally at least one of the following properties; namely, a density from about 0.85 to about 1.05, and more specifically about 0.9 to about 1.0 g/cc; flexural modulus that ranges from about 600 to about 2500 MPa, more specifically about 700 to about 1700 MPa, and still more specifically 900 to about 1300 MPa, about; a tensile strength (at yield) of at least about 8 MPa, more specifically at least about 10 MPa, and still more specifically, at least about 12 MPa; or optionally, shrinkage of less than 1%, and more specifically, less than about 0.7%.

Unless otherwise stated, "melt flow rate" and "melt index" herein is determined by ASTM D1238. For polypropylene, tests are at 230° C. with a 2.16 kg weight. For elastomer, tests are at 190 C and 2.16 kg. Viscosity is determined using a Kayeness Capillary Rheometer, according to ASTM D3835-96 (employing a die diameter of 0.762 mm, a die length of 25.4 mm and an L/D of 33.3). Multiaxial or Instrumented Dart Impact (IDI) Energy measurements are according to ASTM D3763. For illustration purposes, multi-axial dart impact testing (Instrumented Dart Impact) is run on an MTS 810 High Rate instrument using a 2000lb load cell. All specimens are four inch diameter disks that are 0.125 inch thick. The disks are impacted at 6.7 meters/second using an approximately 13 mm tip. The outer 0.5 inch is screw-clamped, leaving 3" of test area. A ductile break (denoted herein by a designation "D") leaves a clean hole punched through the center of the part with plastic drawn up to that hole, and no cracks extending radially out visible to the naked eye.

Density measurements are per ISO 1183 (method A). Notched Izod Impact measurements are according to ASTM D256. Percent crystallinity is measured by differential scanning calorimetry, according to ASTM D3417. A milligram size sample of polymer is sealed into an aluminum DSC pan. The sample is placed into a DSC cell with a 25 cubic centimeter per minute nitrogen purge and cooled to −100C. A standard thermal history is established for the sample by heating at 10C/minute to 225° C. The sample is then cooled (at 10° C./minute) to −100° C. and reheated at 10° C./minute to 225° C. The observed heat of fusion for the second scan is recorded ($\Delta H_{observed}$) The observed heat of fusion is related to the degree of crystallinity in weight percent based on the weight of the polypropylene sample by the following equation:

$$\% \text{ Crystallinity} = \frac{\Delta H_{observed}}{\Delta H_{isotacticPP}} \times 100,$$

where the heat of fusion for isotactic polypropylene as reported in B. Wunderlich, Macromolecular Physics, Volume 3, Crystal Melting, Academic Press, New York, 1980, p. 48, is 165 Joules per gram of polymer.

Glass transition temperature ($T_g$) is measured by compression molding elastomer samples and performing a temperature ramp using a Rheometrics Dynamic Mechanical Spectrometer. The glass transition temperature is defined as the temperature at the tan delta peak. Solid State Testing is done under liquid nitrogen environment, with torsion fixtures, in dynamic mode. A temperature ramp rate of 3° C./min is used, with a frequency of 1 rad/sec, and an initial strain of 0.1%. Average sample dimensions have a length of 45.0 mm, width of 12.6 mm, and thickness of 3.2 mm.

Flexural modulus is measured by ISO 178. Tensile strength (at yield) is measured by ISO 527-1/2. Shrinkage is measured by ISO 294.

The ratio of apparent viscosity of the dispersed phase to the apparent viscosity of the matrix, as plotted as a function of shear rate (e.g., across the shear rate range of 55 to 5500 sec$^{-1}$) is referred to as the "viscosity ratio". It desirably ranges from about 0.2 to 10, more preferably about 0.2 to 7, and more specifically less than about 5. It is possible that at relatively low viscosity ratios (e.g., less than about 20, lamellar morphology likely will result.

The materials resulting from the present teachings generally will exhibit a rubber phase dispersed in a matrix. One common structure will include a plurality of generally uniformly distributed rubber droplets (e.g., from the third material) dispersed in a matrix phase that comprises the polyolefin and ingredients contributed by the first and second materials. The resulting material also exhibits a volume average rubber domain size of about 0.1 micron to about 5 microns, and more specifically, about 0.3 to about 2.5 microns. Atomic force microscopy (AFM) or transmission electron microscopy (TEM) with image analysis is used for rubber domain size analysis. For example, AFM can be used to generate images of the rubber morphology, sampling an injection molded bar, viewing the core of the bar along the direction of flow. Particle size data is generated by using Wavemetrics Igor Pro software (version 5.0.2.0) to first generate Binary (black & white images) from the image created by the Veeco instruments Nanoscope software (version 5.12r3). Once converted to binary it is then processed by Leica Qwin software, generating the particle size analysis. Lamellar morphologies are contemplated also.

The articles in accordance with the present invention find use in a number of applications. Among them, are applications in which polyolefinic materials, and particularly thermoplastic polyolefins, are employed. For example, the materials made according to the teachings herein find attractive application in transportation vehicles as an interior or exterior component, such as fascias, interior trim panels, knee bolsters, instrument panels, handles, or the like. The articles may be shaped and will consist essentially of the materials according to the teachings herein. They may be part of an assembly as well. It is possible for example that a shaped article made according to the teachings herein is laminated to another structure, such as by weld, adhesive bond, fastener or any combination thereof. It is also possible that that articles may be part of an overmolded or co-injection molded assembly.

Examples of bonding agent systems suitable for use herein include, without limitation, cyanacrylates, (meth)acrylics, polyurethanes, silicones, epoxies, or the like. One particularly attractive adhesive includes an organoborane/amine complex, such as disclosed in U.S. Pat. Nos. 6,710,145; 6,713,579; 6,713,578; 6,730,759; 6,949,603; 6,806,330; and Published U.S. Application Nos. 2005-0004332 and 2005-0137370; all of which are hereby expressly incorporated by reference.

The articles may be suitable treated in a secondary operation as well for improving their properties. By way of example, without limitation, they may be coated or otherwise surface treated. For example, in one embodiment, the surfaces of a body can optionally undergo a preliminary treatment prior to attachment to another body. This optional treatment can include cleaning and degreasing, plasma coating, corona discharge treating, coating with another surface treatment, coated with a bonding agent, or any combination thereof. In one embodiment, a body may be subject to a carbon-silica based plasma deposited coating, e.g., as described in U.S. Pat. Nos. 5,298,587; 5,320,875; 5,433,786 and 5,494,712, all hereby incorporated herein by reference. Other surface treatments might also be employed such as plasma surface treatment pursuant to art disclosed teachings as found in U.S. Pat. No. 5,837,958, incorporated herein by reference. In-mold decoration may also be employed.

The following examples illustrate various aspects of the present invention. The values shown are approximate and should not be regarded as limiting of the inventions. Variations in the processing parameters are possible as disclosed throughout the specification. In addition, the results shown may vary as well (e.g., by +/−10% of the stated values or even higher).

EXAMPLES

A formulation is made by dry blending about 54.3 wt % neat polypropylene pellets having a melt flow rate of about 44 g/10 min (a polypropylene available from The Dow Chemical Company under the designation of C705-44NA), about 16.7 wt % of pellets of a masterbatch (which consists essentially of about 60 wt % talc and about 38 wt % of the same neat polypropylene and about 2 wt % additives) and 29 wt % neat elastomer having a melt flow rate at or below about 10 g/10 min (e.g., an elastomer available from The Dow Chemical Company under the designation of Affinity® EG 8200). This pellet mixture is processed using an injection molding machine using various combinations melt temperature, screw speed, and back pressure (see Table 1 below). The resultant articles contain about 10% talc. Ductility is measured by testing multiaxial dart impact resistance over a range of −10 to −30° C. and notched Izod at 0 and 23° C.

A second formulation is made by dry blending about 71.9 wt % neat polypropylene pellets having a melt flow rate of about 12 g/10 min (a polypropylene available from The Dow Chemical Company under the designation of C715-12NHP), about 23.1 wt % of masterbatch pellets that consist essentially of about 65 wt % talc, about 12.9 wt % of the neat polypropylene (e.g., C715-12NHP), about 21.7 wt % LLDPE and about 0.004 wt % additives), and about 5 wt % of a neat elastomer having a melt flow rate at or below about 1 g/10 min (e.g., an elastomer available from The Dow Chemical Company under the designation of Affinity® EG 8150). This pellet mixture is then processed using an injection molding machine using various combinations of melt temperature, screw speed, and back pressure (see Table 2 below). The resultant articles contain about 15% talc. Ductility is measured by testing multiaxial dart impact resistance at −30C and notched Izod at 23° C.

For each of the above first and second formulations the masterbatches are produced, using art-disclosed techniques on a 4" Farrel Continuous mixer using style 15 rotors at a talc loading of about 60-65%. Microscopy of samples made according to the present teachings and samples compounded from neat talc should show similar levels of talc dispersion and no noticeable agglomerates. It is believed important for overall success that the talc is well dispersed. The talc is Jetfil 7C (available from Luzenac), a fine particle size talc (that consists essentially of $3MgO.4SiO_2.H_2O$).

The viscosity of the neat elastomer and the neat polypropylene basestocks is measured on a capillary rheometer at 220° C. A viscosity ratio is calculated and plotted against shear rate. The samples will size well, provide a generally lamellar and/or droplet morphology, exhibit attractive impact properties or a combination thereof. A lamellar morphology is also possible at about a 30% rubber loading when the viscosity ratio is less than about 2.

As with other embodiments herein, the screw that is used suitably functions as a mixing screw, and specifically one for achieving distributive mixing or a combination of both dispersive and distributive mixing. The screw is an Eagle mixing screw supplied by Westland Corp. The feed and transition sections of this screw are designed like a general purpose screw. The meter section of the screw possesses a mixing section comprised of two spiral in-flow and two spiral outflow channels. The mixing flight possesses an undercut that provides a certain degree of dispersive mixing. This mixing flight also contains bypass channels that provide a certain degree of distributive mixing. In some samples, the amount of distributive mixing is further increased through the use of an interfacial surface generating (ISG) mixing nozzle, comprised of 5 elements, supplied by Nickerson Machinery (e.g., Style E IsoMix nozzle).

For sake of comparison, control samples are compounded prior to introduction to an injection molding machine by using a 30 mm twin screw extruder (Werner & Pfleiderer ZSK-30) with an L/D ratio of 29.3. The screw design employs a high intensity, dual stage melting/mixing section employing kneading blocks upstream with blocks of turbine mixing elements downstream. Barrel temperature settings covered a range of 180 to 230° C. with a 300 RPM screw speed. The control examples are materials pre-compounded according to known techniques, and then processed as set forth.

Tables 1 and 2 illustrate a variety of conditions and the results believed possible. Table 1 refers to the lower total rubber materials, and Table 2 refers to the higher total rubber materials. It is seen that mixing (particularly to increase distributive mixing) has the potential to enhance material characteristics, particularly in combination with the processing parameters specified.

The Table 1 examples are believed to produce rubber particle morphology sized to the range of 1.25 to 1.4 um. As seen, variation among the processing parameters can contribute to the final attributes of the resulting materials, and particularly as relating to ductility.

Processing according to the parameters set forth in Table 2 examples is contemplated to produces a lamellar morphology and failure in the ductile mode over a range of varying conditions.

TABLE 1

| Sample | 1A | 2A | 3A | 4A | CONTROL 5A | 6A |
| --- | --- | --- | --- | --- | --- | --- |
| Mixing Nozzle | No | No | Yes | Yes | No | Yes |
| Melt Temperature Setpoint (° F.) | 440 | 440 | 440 | 440 | 405 | 405 |

TABLE 1-continued

| Sample | 1A | 2A | 3A | 4A | CONTROL 5A | 6A |
|---|---|---|---|---|---|---|
| Back Pressure Setpoint (psi) | 0 | 225 | 0 | 225 | 225 | 225 |
| Screw Speed (RPM) | 40 | 70 | 40 | 70 | 70 | 70 |
| −22° F. IDMTS Total energy | 247 | 409 | 315 | 462 | 301 | 365 |
| std dev | 159 | 96 | 81 | 13 | 74 | 115 |
| Break Type (5 samples) | 1 ductile, 4 brittle | 4 ductile, 1 brittle | | | | |
| 73° F. Izod (ASTM) | 3.3 | 3.7 | 4.6 | 8.5 | 2.2 | 8.6 |
| std dev | 0.2 | 0.3 | 1.7 | 0.7 | 0.1 | 1.0 |
| Break Type | partial | partial | mix of partial with no break | no break | mix of complete with partial | no break |

TABLE 2

| Sample | 7A | 8A | 9A | 10A | CONTROL 11A | 12A |
|---|---|---|---|---|---|---|
| Mixing Nozzle | No | No | Yes | Yes | No | Yes |
| Melt Temperature Setpoint (° F.) | 440 | 440 | 440 | 440 | 405 | 405 |
| Back Pressure Setpoint (psi) | 0 | 225 | 0 | 225 | 225 | 225 |
| Screw Speed (RPM) | 40 | 70 | 40 | 70 | 70 | 70 |
| −22° F. IDMTS Total energy | 291 | 384 | 380 | 377 | 360 | 392 |
| std dev | 108 | 31 | 26 | 28 | 15 | 15 |
| Break Type (5 samples) | 3 ductile, 2 brittle | 5 ductile | 5 ductile | 5 ductile | 5 ductile | 5 ductile |
| 73° F. Izod (ASTM) | 11.8 | 12.0 | 12.6 | 12.7 | 11.6 | 13 |
| std dev | 0.3 | 0.2 | 0.1 | 0.2 | 0.4 | 0.1 |
| Break Type | no break | no break | no break | no break | no break | no break |

Tables 3 and 4 illustrates the effects that are believed possible by varying rubber loading levels, polypropylene (PP) melt flow rate, and the elastomer melt index. Without intending to be bound by theory, it is believed that the melt index for the elastomeric constituents can be selected to achieve a desirable viscosity ratio. It is seen that a combination of features typically contribute to a successful material, and that optimization of one characteristic alone may not yield the most successful result. For instance, it will be appreciated from below that attractive domain sizes can still result in a relatively unattractive impact strength if the integrity of the rubber phase is compromised by too much of a low molecular weight fraction. For the below, "PP" refers to polypropylene homopolymer for the first material. In these examples, no concentrate is employed. All of the rubber in these example therefore is derived from the added elastomer.

TABLE 3

| | Higher (30 wt %) Rubber Loading | | | | Lower (22 wt %) Rubber Loading | | |
|---|---|---|---|---|---|---|---|
| Sample | 1B | 2B | 3B | 4B | 5B | 6B | 7B |
| PP MFR | 5 | 20 | 35 | 75 | 5 | 20 | 35 |
| Viscosity Ratio | 3 | 4 to 5 | 4.5 to 7 | 6 to 12 | 3 | 4 to 5 | 4.5 to 7 |
| Rubber Domain Size (um) | 0.34 | 1.25 | 1.25 | 2.41 | 0.39 | 1.08 | 2.25 |
| Notched Izod @ 23° C. (ft-lbs/in) | 14.9 | 13.2 | 13.2 | 1.8 | 14.4 | 9.3 | 1.9 |
| Notched Izod @ 0° C. (ft-lbs/in) | 15.3 | 12.0 | 2.0 | 1.1 | 10.6 | 1.5 | 1.1 |

Ethylene-octene rubber, 1 Melt Index, 0.87 density, −56° C. Tg

TABLE 4

| Sample | Higher (30 wt %) Rubber Loading Varying Morphology Type | | | Lower (22 wt %) Rubber Loading Varying Morphology Type | | |
|---|---|---|---|---|---|---|
| | 2B | 8B | 9B | 6B | 10B | 11B |
| PP MFR | 20 | 20 | 5 | 20 | 20 | 5 |
| Elastomer* Melt Index | 1 | 5 | 5 | 1 | 5 | 5 |
| Viscosity Ratio (VR) | 4 to 5 | 2 to 3 | 1 to 2 | 4 to 5 | 2 to 3 | 1 to 2 |
| Morphology Type | droplet | lamellar | lamellar | droplet | droplet | lamellar |
| Rubber Domain Size (um) | 1.25 | | | 1.08 | | |
| Notched Izod @ 23° C. (ft lbs/in) | 13.2 | 11.1 | 14.4 | 9.3 | 5.1 | 14.5 |
| Notched Izod @ 0° C. (ft lbs/in) | 12.0 | 4 | 12.5 | 1.5 | 1.2 | 1.9 |

*Ethylene-octene rubber, 0.87 density, −56° C. Tg

Without intending to be bound by theory, ductility in the multi-axial impact test and the associated ductile-brittle transition temperature is believed dependent at least upon rubber phase volume, while the notched Izod test and its ductile-brittle transition temperature is believed to be a function of rubber domain size, inter-particle distance or both. Mixing conditions are believed to influence consistency in the rubber phase volume across the part. Taking these considerations into account, in combination with a suitable viscosity ratio for setting a desired rubber domain size is believed to result in materials achieving the desired attributes discussed herein, without the need for compounding (and exposure to unnecessary heat history) of the entirety of the main material constituents.

By way of further illustration, Table 5 shows the expected effect of varying viscosity ratio on rubber domain size (expressed in microns) when comparing materials of the present invention that are blended within an injection molding machine and those that are compounded in advance of introduction into a molding machine. It is believed that the viscosity ratio for achieving a predetermined rubber size will differ from the viscosity ratio otherwise needed when employing prior compounding. The materials in column 1 correspond generally with specific materials from 1B, and materials respectively from within the ranges of 3B and 4B in Table 3. The previously compounded materials (in columns 2 and 3) are prepared by compounding similarly composed materials as in the column 1 materials, in a manner such as described above for the control materials. The effect of employing a mixing nozzle is also examined.

TABLE 5

| | Process Variable | | |
|---|---|---|---|
| | 1 | 2 | 3 |
| Mixing Nozzle | yes | no | yes |
| Viscosity ratio of 3 | 0.34 | 0.68 | 0.50 |
| Viscosity ratio of 5.7 | 1.25 | 0.95 | 0.70 |
| Viscosity ratio of 9 | 2.41 | 1.80 | 1.72 |

As discussed previously, desirably, the process of the present invention is substantially free of a step of compounding together the first, second and third materials prior to the blending step, and specifically a compounding step that includes a melt blending step of the three materials. It will be appreciated that such requirement can still be met by employing dry blend steps below the melting points of the materials. For example, it is possible that prior to introduction of the starting materials into a screw and barrel assembly herein, the materials may be dry mixed (e.g., by a mixing arm in a hopper). A suitable feeder, such as a gravimetric feeder (as discussed) may optionally be employed.

It should be appreciated from the above that it may be possible to omit the concentrate from the materials employed. Thus it is possible that one process may include dry blending a mixture consisting essentially of the above described first and third materials.

While a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute processes in accordance with the present invention.

Unless stated otherwise, dimensions and geometries of the various embodiments depicted herein are not intended to be restrictive of the invention, and other dimensions or geometries are possible. Plural structural components or steps can be provided by a single integrated structure or step. Alternatively, a single integrated structure step might be divided into separate plural components or steps. However, it is also possible that the functions are integrated into a single component or step. Moreover, the disclosure of "a" or "one" element or step is not intended to foreclose additional elements or steps.

The use of "about" or "approximately" in connection with a range applies to both ends of the range. Thus, "about 20 to 30" is intended to cover "about 20 to about 30", inclusive of at least the specified endpoints.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A process for manufacturing an injection molded article, comprising the steps of: feeding to an injection molding machine a first material that includes a polyolefin; feeding to the injection molding machine a second material including an admixture of a particulated filler and a second polyolefin; feeding to the injection molding machine a third material that includes an elastomer; blending the first, second and third materials within the injection molding machine to form a blend; and injecting the blend into a tool wherein the process is substantially free of a step of compounding together the first, second and third materials prior to the blending step; wherein resulting articles will include a material that will have a lamellar morphology, a droplet morphology having a rubber domain size of about 0.1 micron to about 5 microns, or a combination thereof; wherein the injecting step includes passing the blend through a static mixer.

2. The process of claim 1, wherein the injection molding machine includes a hopper located upstream of a screw and barrel assembly, the feeding steps include feeding the first, second and third materials into the hopper, the blending step occurs within the screw and barrel assembly, the screw and barrel assembly has a length to diameter ratio greater than about 15:1, a back pressure of at least about 100 psi is applied to the first, second and third materials during the blending step, a screw speed of about 25 to 250 rpm is employed during the blending step, the blending step occurs at a temperature of about 180 to about 270° C., and the injecting step includes passing the blend through a static mixer, wherein the elastomer includes a copolymer of alpha-olefins selected from the group consisting of i) ethylene and propylene, ii) ethylene and 1-butene, iii) ethylene and 1-hexene; and iv) ethylene and 1-octene, and the first polyolefin includes a polypropylene homopolymer or an impact polypropylene copolymer.

3. A process for manufacturing an injection molded article, comprising the steps of: feeding to an injection molding machine a first material that includes a polyolefin; feeding to the injection molding machine a second material including an admixture of a particulated filler and a second polyolefin; feeding to the injection molding machine a third material that includes an elastomer; blending the first, second and third materials within the injection molding machine to form a blend; and injecting the blend into a tool wherein the process is substantially free of a step of compounding together the first, second and third materials prior to the blending step; wherein resulting articles will include a material that will have (a) a combination of (i) failure in a ductile mode by multi-axial dart impact testing measured using the Instrumented Dart Impact Test of greater than about 90% of samples, at −40° C., −30° C. or 0° C.; and (ii) notched Izod Impact value of at least about 3 ft-lbs/in; (b) a lamellar morphology, a droplet morphology having a rubber domain size of about 0.1 micron to about 5 microns, or a combination thereof; or a combination of (a) and (b); wherein (i) the screw of the injection molding machine includes a plurality of both in-flow channels and out-flow channels; (ii) the injection molding machine includes a mixing flight that includes at least one undercut for providing dispersive mixing, at least one bypass channel for providing distributive mixing or both; (iii) the blending includes dispersive mixing and distributive mixing; or (iv) any combination of (i)-(iii).

4. The process of claim 1, wherein the injection molding machine includes a hopper located upstream of a screw and barrel assembly, and the feeding steps include feeding the first, second and third materials into the hopper.

5. The process of claim 4, wherein the blending step occurs within the screw and barrel assembly, the screw and barrel assembly has a length to diameter ratio greater than about 15:1, a back pressure of at least about 100 psi is applied to the first, second and third materials during the blending step, a screw speed of about 25 to 250 rpm is employed during the blending step, the blending step occurs at a temperature of about 180 to about 270° C.

6. The process of claim 1, wherein the injecting step is part of a multiple operation process selected from blow molding, two stage injection molding, or a combination thereof.

7. The process of claim 2, wherein the injecting step is part of a multiple operation process selected from blow molding, two stage injection molding, or a combination thereof.

8. The process of claim 2, wherein (i) the screw of the injection molding machine includes a plurality of both in-flow channels and out-flow channels; (ii) the injection molding machine includes a mixing flight that includes at least one undercut for providing dispersive mixing, at least one bypass channel for providing distributive mixing or both; (iii) the blending includes dispersive mixing and distributive mixing; or (iv) any combination of (i)-(iii).

9. The process of claim 1, wherein
(i) the polyolefin of the first material is a neat polypropylene homopolymer, a neat polypropylene impact copolymer characterized by a melt flow rate of less than about 70 g/10min measured at 230° C., 2.16 kg, and containing greater than about 8 wt % of ethylene, having greater than about 40% crystallinity, or any combination of a polypropylene homopolymer and a polypropylene impact copolymer;
(ii) the particulated filler is a talc;
(iii) the second polyolefin is a neat polypropylene homopolymer, a neat polypropylene impact copolymer characterized by a melt flow rate of less than about 70 g/10 min measured at 230° C., 2.16 kg, and containing greater than about 8 wt % of ethylene, having greater than about 40% crystallinity, or a combination of a polypropylene homopolymer and a polypropylene impact copolymer; and
(iv) the elastomer of the third material includes an alpha-olefin comonomer, and has a density less than about 0.9, a melt flow rate of about 0.5 to about 30 g/10 min measured at 190° C., 2.16 kg, and a glass transition temperature of less than about −30° C.

10. The process of claim 2, wherein
(i) the polyolefin of the first material is a neat polypropylene homopolymer, a neat polypropylene impact copolymer characterized by a melt flow rate of less than about 70 g/10 min measured at 230° C., 2.16 kg, and containing greater than about 8 wt % of ethylene, having greater than about 40% crystallinity, or any combination of a polypropylene homopolymer and a polypropylene impact copolymer;
(ii) the particulated filler is a talc;
(iii) the second polyolefin is a neat polypropylene homopolymer, a neat polypropylene impact copolymer characterized by a melt flow rate of less than about 70 g/10 min measured at 230° C., 2.16 kg, and containing greater than about 8 wt % of ethylene having greater than about 40% crystallinity, or a combination of a polypropylene homopolymer and a polypropylene impact copolymer; and
(iv) the elastomer of the third material includes an alpha-olefin comonomer, and has a density less than about 0.9, a melt flow rate of about 0.5 to about 30 g/10 min measured at 190° C. 2.16 kg, and a glass transition temperature of less than about −30° C.

11. The process of claim 3, wherein
(i) the polyolefin of the first material is a neat polypropylene homopolymer, a neat polypropylene impact copolymer characterized by a melt flow rate of less than about 70 g/10 min measured at 230° C., 2.16 kg, and containing greater than about 8 wt % of ethylene, having greater than about 40% crystallinity, or any combination of a polypropylene homopolymer and a polypropylene impact copolymer;
(ii) the particulated filler is a talc;
(iii) the second polyolefin is a neat polypropylene homopolymer, a neat polypropylene impact copolymer characterized by a melt flow rate of less than about 70 g/10 min measured at 230° C., 2.16 kg, and containing greater than about 8 wt % of ethylene, having greater than about 40% crystallinity, or a combination of a polypropylene homopolymer and a polypropylene impact copolymer;

(iv) the elastomer of the third material includes an alpha-olefin comonomer, and has a density less than about 0.9, a melt flow rate of about 0.5 to about 30 g/10 min measured at 190° C., 2.16 kg, and a glass transition temperature of less than about −30 C.; or (v) any combination of (i)-(iv).

12. The process of claim 3, wherein
(i) the polyolefin of the first material is a neat polypropylene homopolymer, a neat polypropylene impact copolymer characterized by a melt flow rate of less than about 70 g/10 min measured at 230° C., 2.16 kg, and containing greater than about 8 wt % of ethylene, having greater than about 40% crystallinity, or any combination of a polypropylene homopolymer and a polypropylene impact copolymer;
(ii) the particulated filler is a talc;
(iii) the second polyolefin is a neat polypropylene homopolymer, a neat polypropylene impact copolymer characterized by a melt flow rate of less than about 70 g/10 min measured at 230° C., 2.16 kg, and containing greater than about 8 wt % of ethylene, having greater than about 40% crystallinity, or a combination of a polypropylene homopolymer and a polypropylene impact copolymer; and
(iv) the elastomer of the third material includes an alpha-olefin comonomer, and has a density less than about 0.9, a melt flow rate of about 0.5 to about 30 g/10 min measured at 190° C., 2.16 kg, and a glass transition temperature of less than about −30° C.

13. The process of claim 1, wherein a viscosity ratio of about 0.2 to 7 is employed.

14. The process of claim 2, wherein a viscosity ratio of about 0.2 to 7 is employed.

15. The process of claim 12, wherein a viscosity ratio of about 0.2 to 7 is employed.

16. The process of claim 1, wherein the first material consists of one or more neat polyolefins and optionally one or more additives selected from the group consisting of nucleators, lubricants, slip agents, and stabilizers; the second material consists of one or more particulated fillers, one or more neat polyolefins and optionally one or more additives selected from the group consisting of nucleators, lubricants, lip agents, and stabilizers; the third material consists of one or more elastomers; and the blend consists of one or more neat polyolefins, one or more elastomers, one or more particulated fillers, and optionally one or more additives selected from the group consisting of nucleators, lubricants, slip agents, stabilizers, colorants, reinforcements, colorants, and flame retardants.

17. The process of claim 3, wherein the first material consists of one or more neat polyolefins and optionally one or more additives selected from the group consisting of nucleators, lubricants, slip agents, and stabilizers; the second material consists of one or more particulated fillers, one or more neat polyolefins and optionally one or more additives selected from the group consisting of nucleators, lubricants, lip agents, and stabilizers; the third material consists of one or more elastomers; and the blend consists of one or more neat polyolefins, one or more elastomers, one or more pariculated fillers, and optionally one or more additives selected from the group consisting of nucleators, lubricants, slip agents, stabilizers, colorants, reinforcements, colorants, and flame retardants.

18. The process of claim 3, wherein the screw of the injection molding machine includes a mixing flight that includes at least one undercut for providing dispersive mixing and at least one bypass channel for providing distributive mixing.

19. The process of claim 3, wherein the elastomer includes a copolymers of alpha-olefins selected from the group consisting of i) ethylene and propylene, ii) ethylene and 1-butene, iii) ethylene and 1-hexene; and iv) ethylene and 1-octene, and the first polyolefin includes a polypropylene homopolymer or an impact polypropylene copolymer.

20. A process for manufacturing an injection molded article, comprising the steps of: feeding to an injection molding machine a first material that includes a polyolefin; feeding to the injection molding machine a second material that includes an elastomer; blending the first, and second materials within the injection molding machine to form a blend; and injecting the blend into a tool wherein the process is substantially free of a step of compounding together the first and second materials prior to the blending step; wherein resulting articles included a material having a lamellar morphology, a droplet morphology having a rubber domain size of about 0.1 micron to about 5 microns, or a combination thereof; wherein the injecting step includes passing the blend through a static mixer; wherein the elastomer includes a copolymer of alpha-olefins selected from the group consisting of i) ethylene and propylene, ii) ethylene and 1-butene, iii) ethylene and 1-hexene; and iv) ethylene and 1-octene, and the first polyolefin includes a polypropylene homopolymer or an impact polypropylene copolymer.

* * * * *